Oct. 18, 1955  C. B. DOTY ET AL  2,720,914
SEAT STRUCTURE FOR VEHICLES
Filed Dec. 8, 1952  3 Sheets-Sheet 1
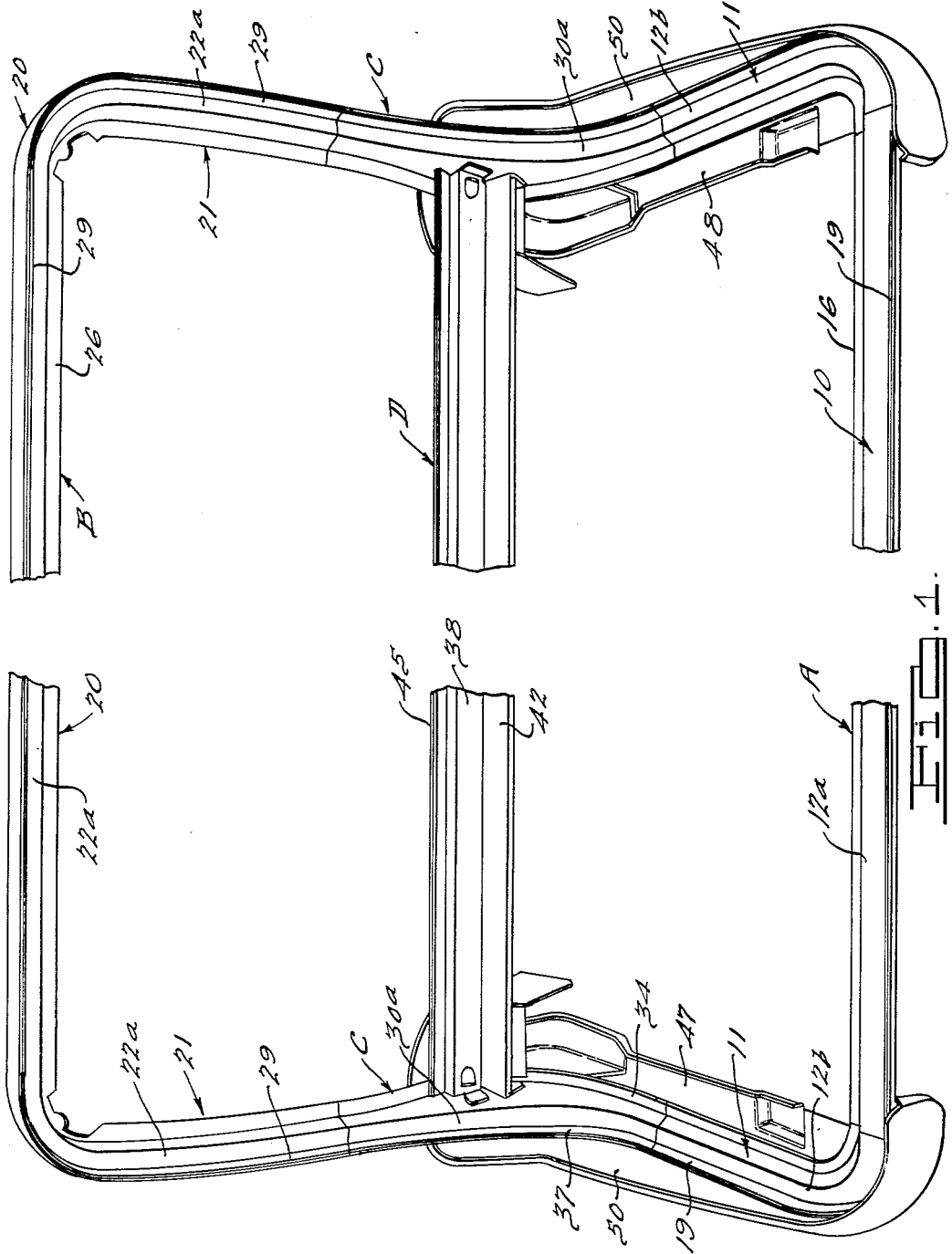
INVENTORS.
Clifford B. Doty,
Claud C. Gage,
John W. McCauley.
BY Elmer Jamison Gray
ATTORNEY.

Oct. 18, 1955   C. B. DOTY ET AL   2,720,914
SEAT STRUCTURE FOR VEHICLES
Filed Dec. 8, 1952   3 Sheets-Sheet 2
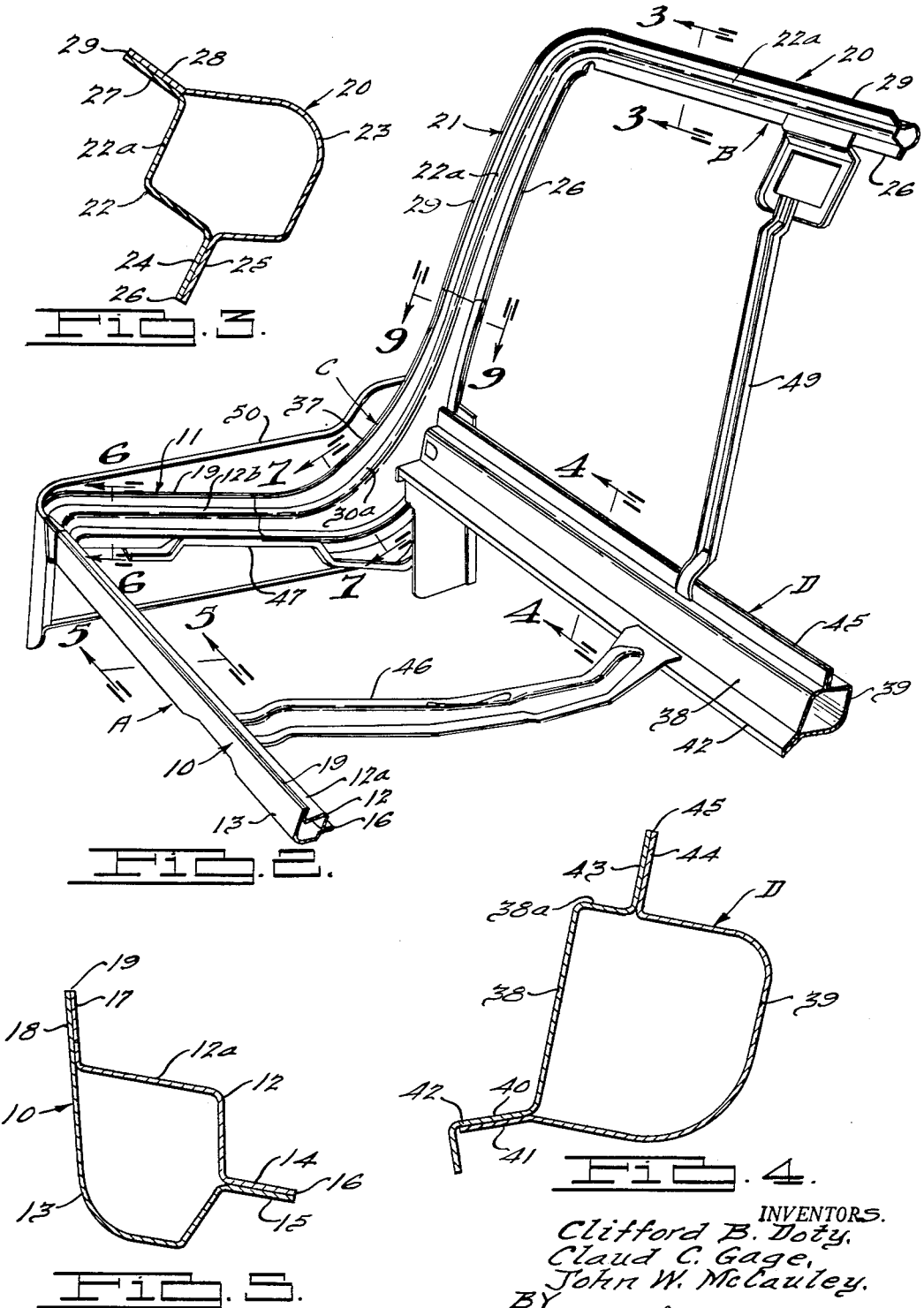
INVENTORS.
Clifford B. Doty,
Claud C. Gage,
John W. McCauley.
BY Elmer Jamison Gray
ATTORNEY.

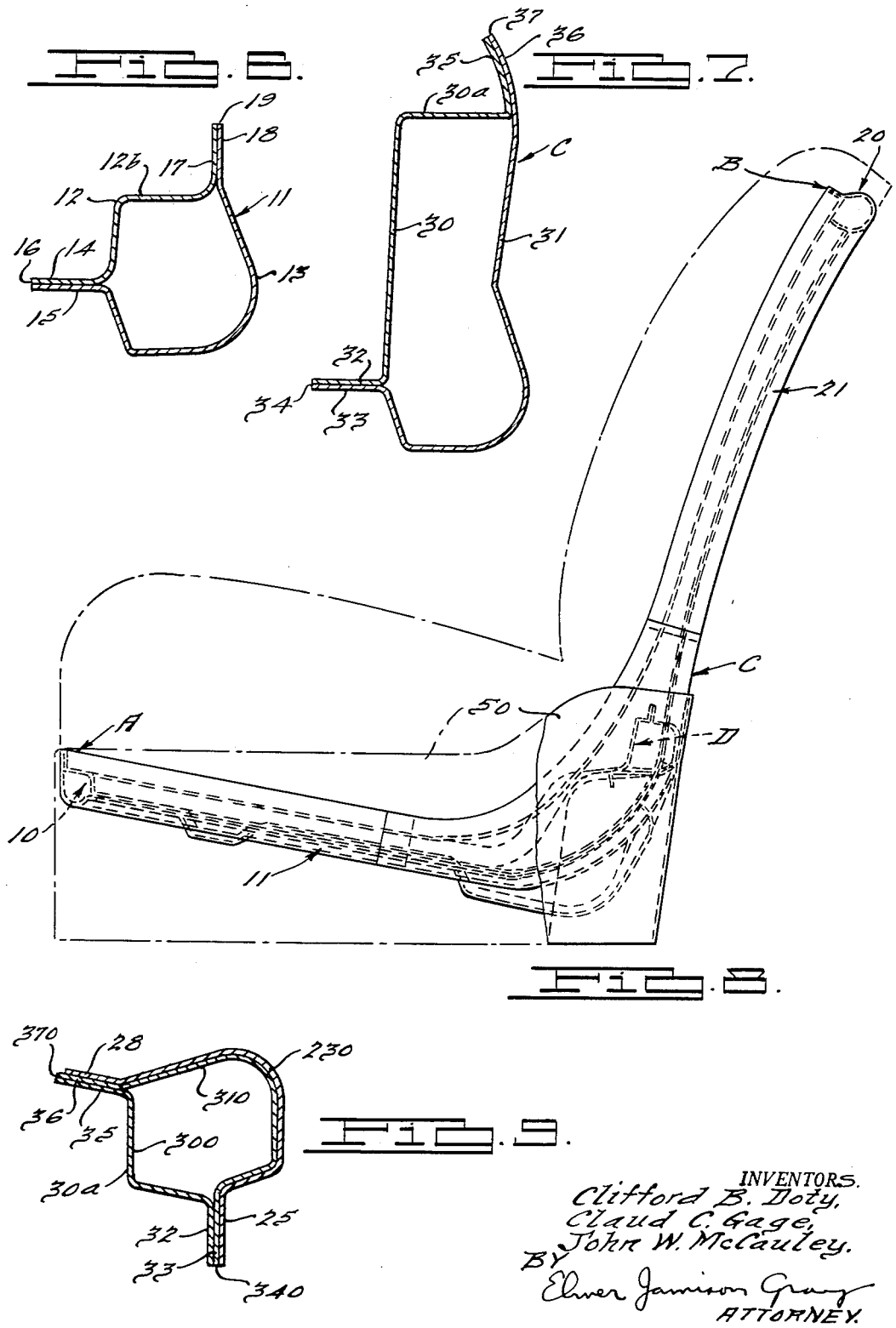

United States Patent Office 2,720,914
Patented Oct. 18, 1955

2,720,914

SEAT STRUCTURE FOR VEHICLES

Clifford B. Doty, Claud C. Gage and John W. McCauley, Detroit, Mich., assignors to Briggs Manufacturing Co., Detroit, Mich., a corporation of Michigan Application December 8, 1952, Serial No. 324,718

7 Claims. (Cl. 155—195)

This invention relates to seat structures for automobiles or other vehicles, the invention pertaining especially to the fabrication of the supporting frame of the seat structure whereby there is provided a skeleton seat and back frame in which the frame members thereof embody an improved cross-sectional construction.

An object of the invention is to provide an improved unitary seat and back frame for supporting seat and back cushion springs wherein the principal portions of the frame are each fabricated from a pair of members, preferably metal stampings, which are joined together to produce a strong and rigid tubular or box-like section of improved and simplified construction which may be manufactured economically.

In accordance with the embodiment of the invention herein illustrated by way of example, the seat structure comprises a main generally U-shaped seat frame unit and a main generally U-shaped back frame unit, these frame units in the preferred construction being separately fabricated and rigidly connected at the junction of the seat and back by elbow or angular sections, each having a generally horizontal portion forming a continuation of the adjacent side extension of the seat frame and an upstanding portion forming a continuation of the adjacent side extension of the back frame. The elbow or angular section is formed with an approximately right angle bend at the juncture of the seat and back and at this region the elbow section has a cross-sectional thickness or depth from front to back appreciably greater than the cross-sectional thickness of the members forming the main U-shaped seat and back frames. The unitary seat and back frame in the illustrated embodiment thus comprises two main generally U-shaped frames joined at the junction of the seat and back by angle or elbow sections of greater depth or thickness in the region of the bends thereof than the portions forming the U-shaped frames, these sections being joined together by a transverse tie bar or cross member. Each of the frame portions of the unitary skeleton seat and back structure, including the angle or elbow sections at the juncture of the seat and back and the cross member connecting these sections, is preferably fabricated from a pair of members stamped or otherwise formed from sheet metal and shaped so that the members, when united together, provide a hollow tubular or box-like section having double thickness flanges projecting from the box section at two angularly related sides thereof. These flanges comprise two edge portions of one member of the box section positioned face to face and contiguous with corresponding edge portions of the other member of the box section. These lapped edge portions of the members are rigidly secured together as by spot welding. The double thickness flanges projecting from the box section in directions generally at right angles to each other impart strength and rigidity to the skeleton frame of the structure. They also serve the purpose of providing ready means for the attachment of cross brace and strainer members and, in addition, certain of the flanges provide locating abutments for confining and maintaining in place the seat and back cushion spring frames which are upholstered in accordance with usual practice.

It is, therefore, a further object of this invention to provide a unitary seat and back frame structure of skeleton formation comprising a frame extending continuously around the sides of the seat and back, said frame being simply and economically fabricated from a pair of metal stampings or the like abutted to produce a tubular or box-like structure, the stampings being rigidly joined together through the medium of edge portions thereof projecting angularly from the box section proper and welded together, the improved construction being preferably such that the box portions of the frame in the regions of the bends between the seat and back frames proper are materially increased in thickness or depth so as to impart added strength and rigidity at these regions where the frame structure is subject to the greatest bending stresses.

Other objects of this invention will appear in the following description and appended claims, reference being had to the accompanying drawings forming a part of this specification wherein like reference characters designate corresponding parts in the several views.

Fig. 1 is a fragmentary perspective view of a unitary skeleton seat frame structure constructed in accordance with one embodiment of the present invention, this view being taken from the front of the seat.

Fig. 2 is a fragmentary perspective view looking towards the left-hand side of the seat frame structure shown in Fig. 1.

Fig. 3 is a transverse section taken substantially through lines 3—3 of Fig. 2 looking in the direction of the arrows.

Fig. 4 is a section taken substantially through lines 4—4 of Fig. 2 looking in the direction of the arrows.

Fig. 5 is a section taken substantially through lines 5—5 of Fig. 2 looking in the direction of the arrows.

Fig. 6 is a section taken substantially through lines 6—6 of Fig. 2 looking in the direction of the arrows.

Fig. 7 is a section taken substantially through lines 7—7 of Fig. 2 looking in the direction of the arrows.

Fig. 8 is an end elevation of the seat frame structure shown in Fig. 1.

Fig. 9 is a section taken substantially through lines 9—9 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention wherein there is provided a main skeleton supporting frame for a vehicle seat structure comprising, as shown in Fig. 1, a main generally U-shaped seat frame unit A, a main generally U-shaped back frame unit B, and two similar angular or elbow sections C rigidly joining the ends of the side portions of the seat and back frames A and B at the regions of the junctions of the seat and back of the structure. The angular sections C of the frame are joined by a transverse tie or cross member D. The parts A, B, C and D comprise the principal portions of the unitary skeleton frame, all being fabricated in generally similar manner as hereinafter described.

Referring to Figs. 2, 5 and 6, the seat frame unit A comprises a front transverse portion 10 extending the width of the seat and terminating integrally in rearward generally right angular extensions 11. As shown in Figs. 5 and 6, the portions 10 and 11 of the seat frame A are fabricated from a pair of members 12 and 13 stamped or otherwise formed from sheet metal, each member being concaved or angularly formed so that the members together produce a tubular or box-like section. The stampings 12 and 13 are provided at one side of the box section with angular edge portions 14 and 15, respectively, which are contiguous and positioned face to face so as to produce a double thickness flange 16. These lapped edge portions 14 and 15 are rigidly secured together as by spot welding. The stampings 12 and 13 at another side of the box section are also formed with edge portions 17 and 18, respectively, which are contiguous and positioned face to face so as to provide a second double thickness flange 19 projecting angularly from the box section. The lapped edge portions 17 and 18 are also rigidly secured together as by spot welding. It will thus be seen that the portions 10 and 11 of the main seat frame unit comprise a continuous tubular or box section formed by the stampings 12 and 13 and also comprise a continuous inwardly extending double thickness flange 16 and a generally vertically extending double thickness flange 19. These flanges project from angularly related sides of the box section in directions generally at right angles to each other. The inner member 12 is constructed and arranged so as to provide a continuous upper generally horizontal seat or ledge 12a, 12b, see Figs. 5 and 6.

The main back frame unit B of the structure is constructed generally similarly to the main seat frame unit B and comprises a top transverse portion 20 extending the width of the seat and terminating in integral downwardly extending extensions 21. Referring to Figs. 2 and 3, the portions 20 and 21 of the back frame unit B are formed from two inner and outer members 22 and 23 stamped or otherwise formed from sheet metal. These members are concaved or angularly formed so as to provide, when joined together, a hollow tubular or box-like section. As shown in Fig. 3, the stampings 22 and 23 are provided with angularly extending edge portions 24 and 25, respectively, which are contiguous and positioned face to face to produce a double thickness flange 26. The edge portions 24 and 25 are rigidly secured together as by spot welding. The stampings 22 and 23 are also formed at another side of the box section with angularly extending edge portions 27 and 28, respectively, which are contiguous and arranged face to face to produce a second double thickness flange 29 projecting angularly from the box section. The edge portions 27 and 28 are also rigidly secured together as by spot welding. Thus, the back frame unit B comprising portions 20 and 21 is in the form of a continuous box section produced by the members 20 and 22, and this box section is provided with double thickness flanges 26 and 29 which project from angularly related sides thereof in directions generally at right angles to each other. The member 22 of this box section is constructed and arranged so as to provide a continuous seat or ledge 22a bounded by the outwardly projecting flange 29.

The corresponding ends of the side extensions 11 and 21 of the seat and back frame units at each side of the seat structure are spaced apart and connected together by means of one of the angular or elbow sections C. Each elbow section, as in the case of the seat and back frames A and B, is box-like in formation and provided with double thickness flanges projecting from angularly related sides thereof. However, this box section varies in cross sectional depth, having the greatest depth or thickness in cross section at the mid-region thereof where the elbow member C is formed with a bend at the locality of the juncture of the seat and back. Referring to Fig. 7, which view is taken in the region of the bend of the elbow section C where the cross sectional depth of the member is substantially greatest, it will be seen that the elbow section C is fabricated from a pair of inner and outer members 30 and 31, respectively, which are stamped or otherwise formed from sheet metal and angularly shaped so that the members, when joined together, will produce a box section. The stampings 30 and 31 are formed with inwardly extending edge portions 32 and 33, respectively, which are contiguous and arranged face to face to provide a double thickness flange 34. These edge portions 32 and 33 are rigidly secured together as by spot welding. The stampings 30 and 31 are also formed at another side of the box section with upwardly extending edge portions 35 and 36, respectively, which are also arranged face to face and secured together, as by spot welding, to provide a double thickness flange 37. The box section of the elbow or angular member C progressively diminishes in depth in opposite directions from the mid-region thereof and terminates in box-like end portions of such reduced depth or thickness as to enable them to be joined to the ends of the side portions 11 and 21 of the seat and back frames. These reduced end portions of the members 30 and 31 are shown at 300 and 310 in Fig. 9. The opposite ends of the elbow member C preferably abut the ends of the side portions 11 and 21 and these abutting ends are welded together along the meeting edges of the box sections. In addition, the outer member 23 of the side portion 21 of the back frame has an extension 230, see Fig. 9, which snugly telescopes over the reduced end 310 of the member 31 and is spot welded thereto at a suitable number of points. It will be seen from Fig. 9 that the flange extensions 25 and 28 of the telescoping extension 230 overlap the flange portions 32, 33 and 35, 36, respectively, and are rigidly secured thereto as by spot welding. Thus, at this locality where the extension 230 telescopes over the end portion 310 there are provided flanges 340 and 370 of triple thickness which form continuations of the flanges 26, 29 and the flanges 16, 19. It will be understood that the manner of joining the forward reduced ends of the elbow member C with the side portions 11 of the seat frame is substantially the same as illustrated in Fig. 9.

The angular or elbow sections C of the frame structure are rigidly joined together by means of a transverse tie bar or cross member D which is also preferably fabricated in a manner similar to the frame members hereinabove described. As illustrated in Figs. 2 and 4, the cross bar D is formed from two members 38 and 39 which may be stamped from sheet metal or otherwise formed and which, when joined together, produce a box section. The stampings 38 and 39 are provided with forwardly projecting edge portions 40 and 41, respectively, which are positioned face to face and secured together, as by spot welding, to provide a double thickness flange 42. The stampings 38 and 39 are also provided at the upper side thereof with upwardly projecting edge portions 43 and 44 which are arranged face to face and secured together, as by spot welding, to provide an upwardly extending double thickness flange 45. The members 38 and 39 are angularly formed to produce the box section and the upper angular side of the member 38 forms a ledge or seat 38a in advance of the flange 45. The ends of the tie bar or cross member D have angular flange portions which abut the inner sides of the elbow member C and are rigidly secured thereto as by spot welding.

The front portion 10 of the seat frame unit is connected to the cross member D midway of the seat structure by means of a strainer member 46 the ends of which overlap the flanges 16 and 42 and are rigidly secured thereto as by spot welding. A pair of longitudinally extending members 47 and 48 (Fig. 1) spot welded to the underside of the side flanges 16 and 34 form parts of the seat guides associated with the usual fore and aft seat adjusting mechanism. The cross member D is rigidly connected to the top transverse portion 20 of the back frame through the medium of a suitable strainer member 49 the ends of which are rigidly attached to the flanges 45 and 26 as by spot welding. The ends of the seat frame may be enclosed and concealed by means of suitable stamped metal panels 50 having skirt portions extending adjacent to the floor and end portions extending around the front and back corners of the seat.

It will be noted that the double wall flanging of the frame members forming the unitary skeleton frame structure, namely, flanging 19, 37 and 29 extends continuously around the sides of the seat and back portions, and that the substantially flat walls or ledges 12a, 12b, 30a and 22a extend continuously and inwardly from this continuous flanging. This marginal flanging provides abutment walls for locating and confining in place the wire spring frames conventionally used for the seat and back cushions. Moreover, the flat walls 12a, 12b, 30a and 22a provide supporting seats against which the spring frames may be mounted, the ledge 38a of the cross member providing a seat for the lower edge of the back spring frame which abuts the flange 45. The marginal double wall flanging 16, 34 and 26 also extends continuously around the sides of the seat and back frames and provides a convenient means for the attachment of such members as the seat guide members 47, strainers 46 and 49 and cross member D. It will also be seen that by forming the continuous box sections of the seat and back frames from a pair of formed sheet metal members having the projecting accessible edge portions arranged face to face to provide double wall flanges, the members of the box section may be easily and conveniently attached together along the flanging by the use of open spot welding. Thus, the projecting flanges enable a tubular or box-like frame to be produced easily and economically while also imparting strength and rigidity thereto.

We claim:

1. In a seat frame structure for a vehicle body, a generally U-shaped seat frame portion, a generally U-shaped back frame portion, and angular frame portions having bends therein joining said seat and back frame portions to provide a unitary skeleton frame structure, each frame portion comprising a pair of sheet metal members extending side by side and secured together to form a closed box section having a pair of flanges projecting from angularly related sides thereof, the opposite ends of the angular frame portions being telescoped with the ends of the seat and back frame portions and rigidly secured thereto.

2. In a seat frame structure for a vehicle body, a generally U-shaped seat frame portion, a generally U-shaped back frame portion, and angular frame portions having bends therein joining said seat and back frame portions to provide a unitary skeleton frame structure, each frame portion comprising a pair of sheet metal members extending side by side and secured together to form a closed box section having a pair of flanges projecting from angularly related sides thereof, the opposite ends of the angular frame portions being telescoped with the ends of the seat and back frame portions and rigidly secured thereto, the cross-sectional thickness of the box sections of the angular frame portions in the regions of the bends therein being materially greater than the cross-sectional thickness of the box sections of the seat and back frame portions.

3. In a seat frame structure for a vehicle body, a generally U-shaped seat frame portion, a generally U-shaped back frame portion, and angular frame portions having bends therein joining said seat and back frame portions to provide a unitary skeleton frame structure, each frame portion comprising a pair of sheet metal members extending side by side and secured together to form a closed box section having a pair of flanges projecting from angularly related sides thereof, the cross-sectional thickness of the box sections of the angular frame portions in the regions of the bends therein being materially greater than the cross-sectional thickness of the box sections of the seat and back frame portions.

4. In a seat and back frame structure for a vehicle body, a unitary skeleton supporting frame including front and side frame members for the seat and top and side frame members for the back, said side frame members having bends at the junctures of the seat and back, each frame member comprising a pair of angularly formed sheet metal members disposed side by side to provide a box section and having projecting edge portions secured together to form a double wall flange or flanges extending from the box section, the cross-sectional thickness of the box sections in the regions of said bends being materially greater than the cross-sectional thickness of the adjacent box sections.

5. In a seat and back frame structure for a vehicle body, a unitary skeleton supporting frame including front and side frame members for the seat and top and side frame members for the back, said side frame members having bends at the junctures of the seat and back, each frame member comprising a pair of angularly formed sheet metal members disposed side by side to provide a box section and having projecting edge portions secured together to form a double wall flange or flanges extending from the box section, and a cross frame member joining the side frame members at the locality of said bends and comprising a pair of sheet metal members disposed side by side to provide a box section, said last named members being joined together by projecting edge portions thereof forming a double wall flange or flanges.

6. A seat frame structure according to claim 1 including a cross frame member joining said angular frame portions at the locality of the bends therein and comprising a pair of sheet metal members extending side by side and secured together to form a box section having projecting angularly related edge portions thereof forming double wall flanges.

7. A seat frame structure according to claim 3 including a cross frame member joining said angular frame portions at the locality of the bends therein and comprising a pair of sheet metal members extending side by side and secured together to form a box section having projecting angularly related edge portions thereof forming double wall flanges.

References Cited in the file of this patent

UNITED STATES PATENTS

| Number | Name | Date |
|---|---|---|
| 1,665,351 | Gibbs | Apr. 10, 1928 |
| 2,145,660 | Marshall et al. | Jan. 31, 1939 |
| 2,169,197 | Reed | Aug. 8, 1939 |
| 2,265,901 | Grieg | Dec. 9, 1941 |
| 2,371,407 | Neely | Mar. 13, 1945 |

FOREIGN PATENTS

| 438,465 | Great Britain | Nov. 18, 1935 |